Figure 1:
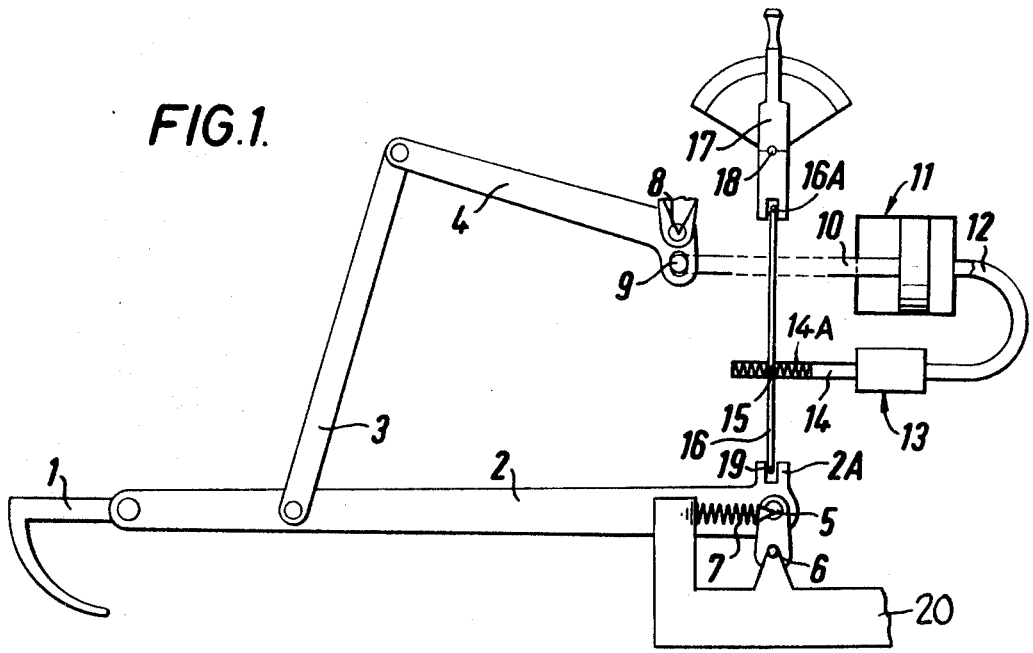

United States Patent

[11] 3,595,319

| [72] | Inventor | Frederick John Adams |
| | | Campton, Beds, England |
| [21] | Appl. No. | 752,577 |
| [22] | Filed | Aug. 14, 1968 |
| [45] | Patented | July 27, 1971 |
| [73] | Assignee | Cam Gears (Luton) Limited |
| | | Luton, Bedfordshire, England |

[54] IMPLEMENT CARRYING LINKAGE MEANS
7 Claims, 3 Drawing Figs.

[52] U.S. Cl. .................................................. 172/9
[51] Int. Cl. .......................................... A01b 63/112, A01b 63/114
[50] Field of Search .......................................... 172/7, 9

[56] References Cited
UNITED STATES PATENTS

| 2,965,181 | 12/1960 | Senkowski | 172/7 X |
| 3,142,342 | 7/1964 | Brudnak et al. | 172/9 |
| 3,414,062 | 12/1968 | Koenig | 172/7 |
| 2,940,530 | 6/1960 | Du Shane | 172/7 |
| 2,968,353 | 1/1961 | Edman | 172/7 |
| 3,004,610 | 10/1961 | Pomper et al. | 172/7 |
| 3,112,798 | 12/1963 | Foxwell | 172/7 |
| 3,255,828 | 6/1966 | Abbott | 172/7 |

*Primary Examiner*—Robert E. Bagwill
*Assistant Examiner*—Alan E. Kopecki
*Attorney*—Hill, Sherman, Meroni, Gross and Simpson

ABSTRACT: A three-point linkage for an implement-carrying tractor has one link horizontally moveable against resilience, and has a linkage whereby manual control is exercised differentially to drag load, upon the valve which controls the draft-controlling ram.

INVENTOR
Frederick John Adams
ATTORNEY

IMPLEMENT CARRYING LINKAGE MEANS

This invention relates to a three-point implement-carrying tractor linkage, of the kind in which draft control is by a hydraulic ram. Basically, requirements of such apparatus are control of a load both in sense of direction (i.e., up and down) and positionally, hydraulic locking of the load in a position, provision against overload, provision against too rapid a return movement from the load position, adjustability, and response to a followup.

The invention resides in a ram-actuated system for a three-point tractor linkage or any other system presenting similar requirements, and it seeks to fulfill these requirements.

According to the invention there is provided a three-point implement-carrying tractor linkage which is draft controlled by a hydraulic ram, in which one of the links is pivotally connected to the tractor for vertical angular movement with change of implement height, the pivot of this link being resiliently carried by the tractor so as to afford longitudinal movement of the link against resilience; a control lever is pivotally connected at one end to a manual control element and pivotally connected at a location spaced from that end through a resilient connection to a valve controlling the ram and at a further location spaced on the lever also pivotally connected to the said one link all so that the valve is moved differentially by (a) movement of the manual element, (b) angular movement of the said one link and (c) longitudinal movement of the said one link.

The invention includes further features subsidiary to the foregoing, which will be stated in the claims.

Figure 2:
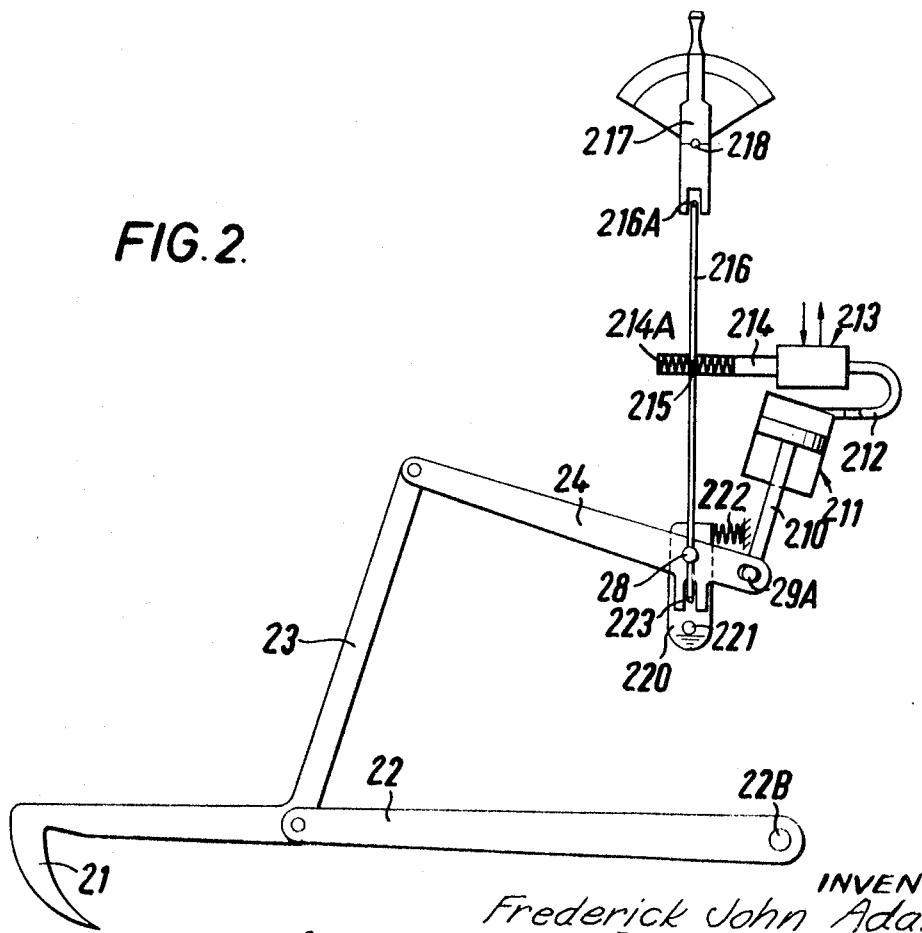
Figure 3:
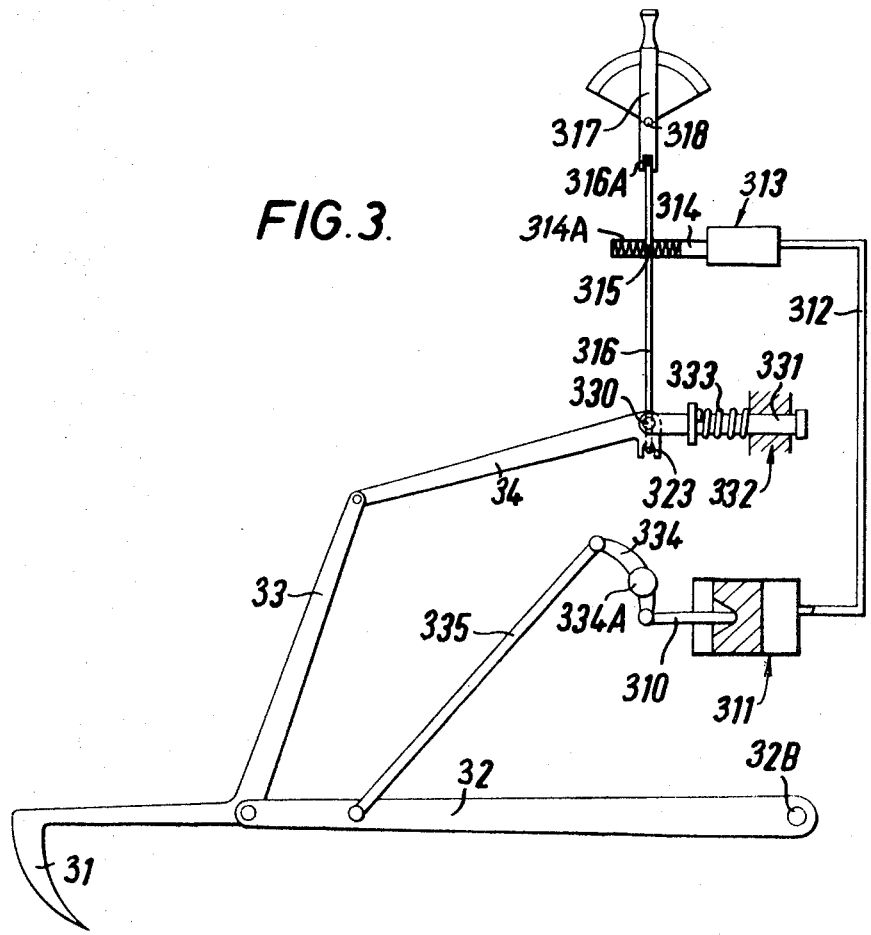

The invention can be better understood from the following description of examples. In these:

FIG. 1 shows, schematically and in side elevation, a three-point linkage according to the invention;

FIG. 2 similarly shows an arrangement alternative to FIG. 1;

FIG. 3 similarly shows another example.

Turning to FIG. 1, the linkage is shown as carrying an imaginary implement 1 which might for example be a plough. It is assumed that the implement requires substantial and varying tractive effort and that it will require to be draft controlled. The implement 1 is carried at the rear of the drag links 2 which through the link 3 is raised or lowered by the actuated draft link 4. The links 2 are pivotally attached at 5 to a short lever arm (or arms) 6 which are in turn pivotally supported by the tractor. A compression spring, represented diagrammatically at 7, connects the lever 6 to a fixed part of the tractor, thus opposing the drag force of the implement 1.

The draft link 4 is pivotally mounted on the tractor at 8 and its end is a bell crank pivotally attached at 9 to the rod 10 of a hydraulic actuator ram indicated generally at 11. The ram is single acting and is supplied by a pipe 12 from the control valve generally indicated at 13. The spool of this valve has an operating rod 14 to which there is connected a resilient means 14A which may take the form of balanced coil springs; to which spring means 14A there is pivotally linked at 15 a control lever 16. The pivot at 15 is mounted between balanced springs 14A which protect the valve 13 from excessive load, and it forms in effect the fulcrum of the control lever. The resilient connection between members 14, 14A and 16 may take the form of a hollow tubular structure of greater diameter than the member 16 and have a resilient spring means therein. A slot in the top and bottom of the member 14 exposes the resilient spring and allows the member 16 to pass therethrough in engagement with the resilient means. A pivot connector 15 passes through the member 15 and is received in an elongated lateral guide slot to allow the resilient movement between the members 14, 14a and 16. The link 2 is pivotally connected to lever arm 6 which is itself pivotally connected to the tractor. The link 2 can therefore move upward independently of link 4 by clockwise rotation of link 3 about the link 3/link 4 joint, counterclockwise rotation of link 2 about the link 3/link 2 joint and simultaneously clockwise rotation about 5, and counterclockwise rotation of arm 6 about its joint with the tractor. The lower end of lever 16 is connected by pivot and slot at 19 to a bell crank extension 2A of the link 2, and at its upper end the lever 16 is rockable through pivot and slide engagement at 16A, by movements in either sense, of the operator's manual lever 17 which is pivoted at 18 in a conventional quadrant fitting which preferably provides for locking the lever 17.

Assuming that movement of the rod 14 to the left corresponds to admission of pressure fluid to the ram 11 and vice versa, the operation is as follows. Clockwise movement of lever 17 causes actuation of the linkage by admission of pressure fluid into ram 11. Rod 10 moves to the left, swinging lever 4 upwards. This, through link 3, raises link 2 and implement 1. In this operation, the lever 16 rocks anticlockwise about pivot 19. Lever 6, held by spring 7, remained stationary. As the link 2 raises crank 2A, rotating clockwise, rocks lever 16 anticlockwise about pivot 16A, thereby moving valve rod 14 to the right; this then provides a follow up action which decides that the ram 11 is moved through a distance determined by the position of the operator's lever 17. To lower the implement 1, the lever 17 will be moved to the left. Now if the implement encounters on obstacle, excessive tension is set up in link 2 and this rocks lever 6 anticlockwise against spring 7. This causes lever 16 to rock clockwise about pivot 16A, so that valve rod 14 moves left, admitting fluid to ram 11 and raising the implement 1 until the excessive tensile load in link 2 disappears, and the spring 7 supervenes, which restores the linkage to the condition before the excess arose. Similarly if the excessive force should move link 2 upwardly this will be detected by the control lever 16 which will actuate the valve 13 to raise the implement 1 until the excessive force disappears. It will thus be seen that the lever acts as a differential connection, correlating the valve 13 with the manual control, angular movement of link 2, and longitudinal movement of link 2.

FIG. 2 illustrates some parts which are substantially the same and have the same references. In this example, the link 2 is pivoted directly to the tractor at 2B. The lever 4 is extended forwardly beyond its pivot 8, and to the tail so formed the rod 10 of the ram 11 is pivoted at 9A. The pivot 8 is supported by a lever 20 pivoted at 21 to the tractor, the lever 20 being held by a compression spring 22 which opposes clockwise movement of lever 20. Lever 4 has a lateral slot-and-pivot connection at 23 with the lever 16.

This arrangement again affords the required positioning followup. Further, if there is an excess upward load from the implement 1, tending to rock lever 4 about pivot 9A, this (through pivot 8) tends to rock lever 20 clockwise, compressing spring 22, and shifting pivot 23 to the right, so relieving ram pressure. This reaction effect can be varied according to design requirements, by selecting the normal position of the lever 20 so that it is more, or less, loaded by clockwise (upward) force in lever 4. For example the more nearly 4 and 20 are in alignment, the greater will be the resultant rocking load transmitted against the spring 22.

Turning now to FIG. 3 again equivalent parts are similarly numbered. The draft link 4 in this case is a control draft link and is connected at pivot 30 to a rod 31, which is slidably mounted in a suitable part, indicated by 32, of the tractor, and its movement in one sense (to the right) is resiliently resisted by a compression spring 33. The bellcrank or tail part of the link 4 is, as before, connected by slot and pivot at 23 with control lever 16. The single-acting hydraulic ram at 11 is connected by its rod 10 to a bellcrank lever 34 (pivotally carried at 34A by the tractor) and a second draft link 35 connects the lever 34 to the drag link 2. To raise the implement 1, the ram 11 acts under control of the valve 13, rocking lever 34 clockwise and thereby tensing the link 35. It will be seen again that the control lever 16 (and therefore the valve 13) acts differentially to transmit movement of the manual element 17, longitudinal movement of link 4 (against spring 33) or angular movement of link 4 about pivot 30.

In the foregoing descriptions, the assumption is that the implement 1 is some kind of draft-controlled earth-penetrating implement. The invention is, however, applicable wherever the same factors and problems arise and the word "implement" is therefore to be deemed to include any linkage-borne apparatus involving the same considerations.

We claim:

1. An implement-carrying linkage means for tractors comprising a generally horizontal drag link having a first end and a second end, said drag link being attached at its first end to a generally horizontally movable resilient pivot means, said second end having an implement connected therewith, said resilient pivot means including a normally generally vertically positioned pivot link having first and second ends, said pivot link first end being pivotally connected to said first end of said drag link and said pivot link second end being pivotally attached to said tractor, a spring means connected between said tractor and said pivot link maintaining said pivot link in a generally vertical position but allowing generally horizontal linear movement of said drag link in response to forces on said implement, a control lever means generally vertically inclined generally above said drag link first end, said control lever having a first end, an intermediate portion and a second end, a generally horizontal linearly moving valve actuating rod means, a manual control element, said control lever having its first end pivotally connected to said manual control element, its second directly pivotally engaging said drag link first end adjacent said resilient pivot means, and its intermediate portion resiliently connected to said valve actuating rod means; said control lever being pivotable about its second end by said manual control element and being pivotable about its first end by horizontal movement of said drag link about said generally horizontally movable resilient pivot means, a ram means connected to said tractor and linked with said drag link and controlled by said valve actuating rod means to pivot said drag link about its first end, said control lever automatically and manually controlling the movement of said drag link by said ram means in response to any combination of movement of the control lever by pivotal movement of said drag link about its first end, generally horizontal movement of said drag link about said resilient pivot means and movement of said manual control element.

2. A linkage means according to claim 1 including a valve means, said valve actuating rod means being connected with said valve, said valve means controlling movement of said ram means, said valve actuating rod means including a balance spring means, said control lever being connected to said balanced spring means to protect the valve from excessive load and operating vibrations.

3. A linkage means according to claim 1 wherein said control lever second end is connected to said first end of said drag link by a pivot and slot in a bellcrank extension of said drag link.

4. A linkage means according to claim 1 wherein said manual control element includes a rockable handle having a first end pivotally connected to said control lever through a pivot and slide engagement, a second end providing a handle and an intermediate pivot allowing movement of said first end by said handle end.

5. In an implement-carrying linkage means for a tractor including a link means having a first end and a second end, said first end being attached to a movable resilient pivot means connected to the tractor, said second end having an implement means connected thereto, said pivot means allowing both or either generally horizontal and angular movement of said link means with respect to said tractor, a power lift means connected between said tractor and said link means, a control means operatively connected to said power lift means, which control means may be manually set and which is automatically responsive to both or either horizontal and angular movement of said link means about said movable resilient pivot means to move said link means to compensate for external forces acting on said link means through said implement means.

6. A linkage according to claim 5, in which said first end of said link means is disposed as a bellcrank, and said control means is directly pivotally engaged with said first end of said link means through a slot.

7. A linkage according to claim 5 wherein said control means includes a control lever resiliently pivotally connected to a valve actuating means which is subject to its own linear movement, said pivotal connection between said control lever and said valve actuating means locating the control lever in the manner of a fulcrum whereby the linear movements in either direction from a neutral condition involve a straining of the resilient connection.